May 19, 1936. H. L. FORMAN Re. 19,973
REFRIGERATING APPARATUS AND PROCESS
Original Filed Aug. 25, 1932 2 Sheets-Sheet 1
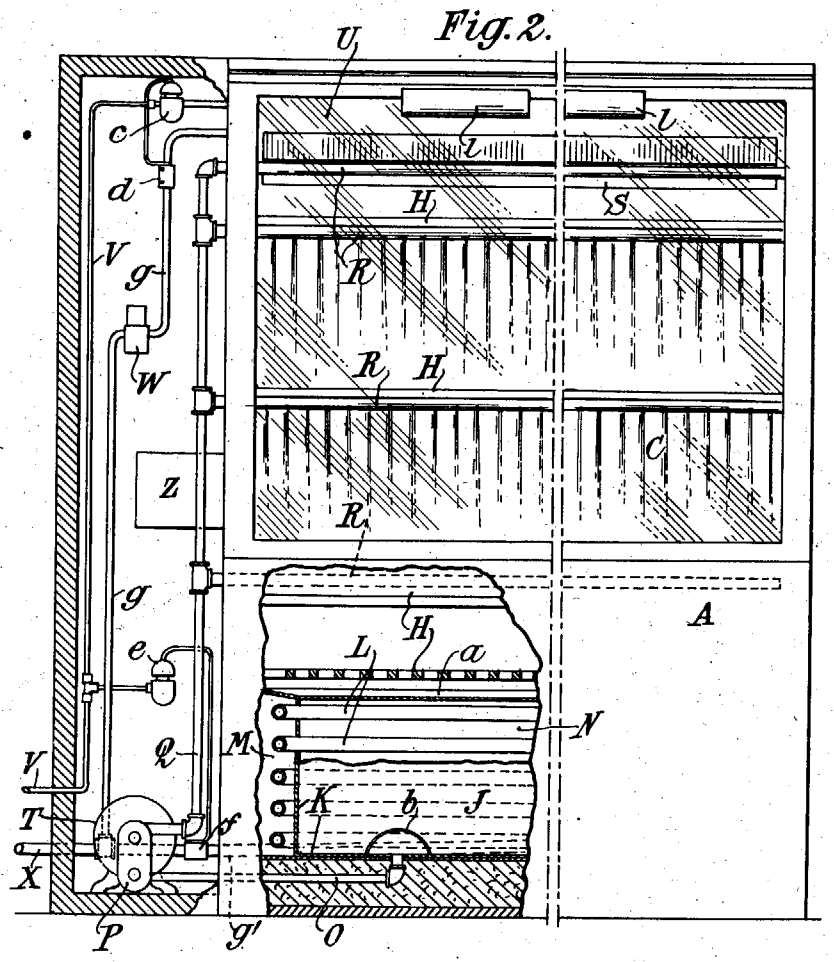
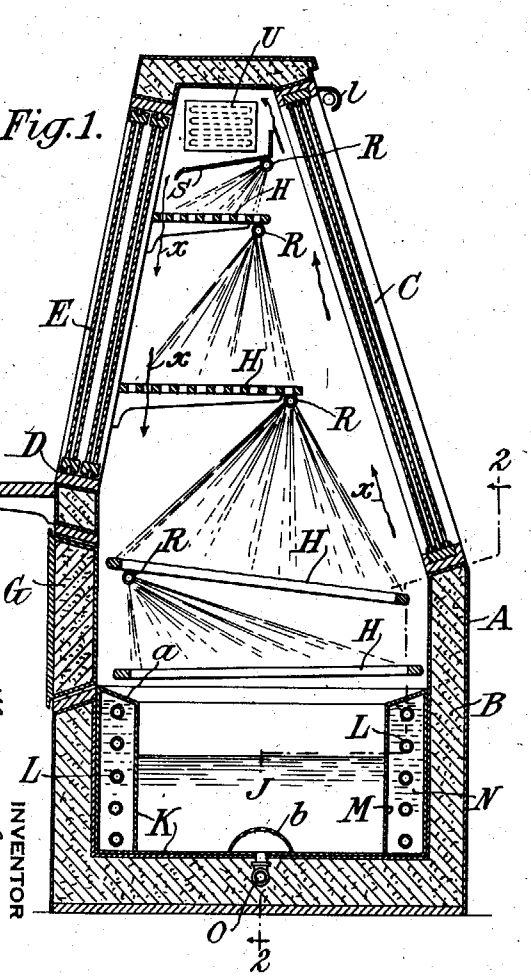
INVENTOR
Howard L. Forman,
BY
Fraser, Myers & Manley,
ATTORNEYS.

May 19, 1936. H. L. FORMAN Re. 19,973

REFRIGERATING APPARATUS AND PROCESS

Original Filed Aug. 25, 1932 2 Sheets-Sheet 2

INVENTOR
Howard L. Forman,
BY
Fraser, Myers & Manley
ATTORNEYS.

Reissued May 19, 1936 Re. 19,973

UNITED STATES PATENT OFFICE 19,973

REFRIGERATING APPARATUS AND PROCESS

Howard L. Forman, Kitchawan, N. Y.

Original No. 1,908,968, dated May 16, 1933, Serial No. 630,349, August 25, 1932. Application for reissue January 2, 1934, Serial No. 705,005

26 Claims. (Cl. 62—104)

This invention relates to a refrigerating method and apparatus designed especially for preservation and display of fish, although applicable also to other substances.

The preservation of fish in display cases or other refrigerators involves a difficult problem. Fish require to be kept moist, and the use of mechanical refrigeration has been found undesirable because the air within the refrigerator is kept too dry. Heretofore the most practical means, and that adopted by practically all fish dealers, has been to use a simple display case with a glass front or top having a deep tray of ice on which the fish are laid in one or more layers, whereby they are kept sufficiently cool and moist. This method involves frequent recharging with broken ice, and is expensive, but on the whole it has been found more practical than any other system.

The present invention aims to provide a refrigerating show case or other storage chamber in which fish or the like can be successfully preserved and displayed for sale or stored, the cooling means being artificial or electric refrigeration, whereby to effect a saving of about two-thirds the cost of preserving fish in ice-cooled display cases. The invention aims, on the one hand, to keep the fish sufficiently moist and at the same time to guard against freezing which has been a fault of the attempts at mechanical refrigeration heretofore.

To these ends this invention provides a refrigerator casing having a chamber preferably of the upright type, which may have suitable glass doors or windows for display and access, and suitable racks or shelves for carrying the fish or other articles. At the bottom or lower part of the chamber is an ice-water bath containing fresh water or dilute brine, which is maintained at a low temperature as near as is practicable to the freezing point, but usually without forming ice,—say at 32–34° F. A chill coil preserves this water bath at the required temperature. From the bath the cold water is drawn at stated intervals by a pump, and is showered or otherwise discharged through spray pipes or sprinklers upon the shelves or trays of fish. Means are provided for stopping the spray of cold liquid whenever the refrigerating chamber is opened to get access to its contents. At the top or upper part of the refrigerator chamber is a refrigerating unit or element hereinafter referred to as a chill coil or self-defrosting coil adapted to maintain the air within the refrigerator at a temperature preferably of about 35 to 40° F. This coil receives refrigerant at a suitably low temperature, which may bring the coil to as low as 20° F., so that vapor in the chamber will congeal upon its surface. At intervals the circulation of refrigerant is interrupted and the congelation permitted to thaw off. This coil thus acts intermittently to cool the chamber.

The accompanying drawings show a preferred embodiment of the invention.

Figure 1 is a vertical, transverse section.

Fig. 2 is a vertical, longitudinal section.

Figure 3:
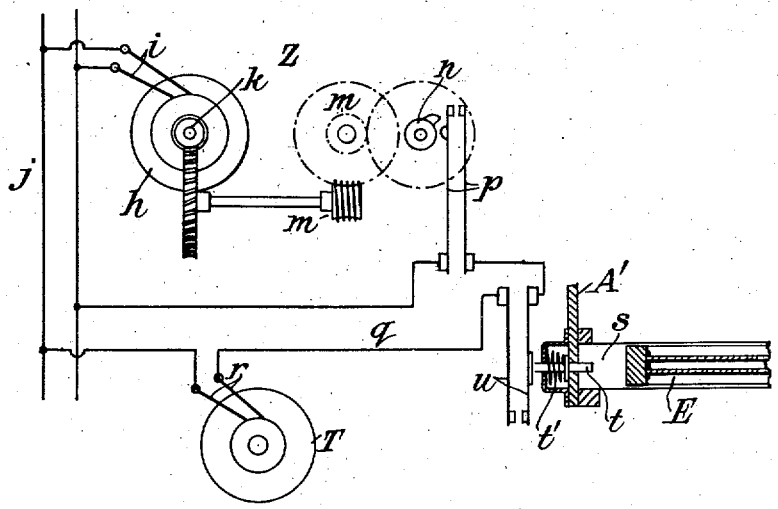
Fig. 3 is a diagrammatic view, illustrating means for controlling the intermittent flow of spray water.

Referring to the drawings, A is the refrigerator casing of any usual or suitable construction, having the customary inner and outer walls, and non-conducting filling B between them. The casing is preferably a display case having a large front opening C, covered with triple plate glass for conserving the internal temperature. At the back is an opening D for getting access to the interior for placing and removing its fish or other contents being preserved, and this is closed by one or more doors or windows E, which may be of the hinged or sliding type. Fig. 1 shows a convenient shelf F, and beneath this another door G for getting access to a lower compartment of the refrigerator chamber. Within the chamber are any suitable number of shelves or racks H, H, on which the fish or other substances are supported and displayed.

In the bottom or lower portion of the refrigerator casing or other convenient arrangement is an ice water bath J, preferably formed of a tank K with an open top and cooled by a chill coil L of pipes through which a refrigerant is circulated. This coil is preferably enclosed in a jacket M, containing a liquid N of low freezing point, such as glycerine or dense brine, which conveys heat units from the water or other liquid in J to the coil L. This jacket is preferably closed at the top by an inwardly-sloping cover *a*, the purpose of which is to return the drippings of sprayed ice water or other cold liquid back into the bath.

From the bottom of the tank K, and preferably protected by a strainer *b*, leads a pipe O, which runs to the suction of a circulating pump P, from the discharge of which leads a pipe Q which feeds a series of branch pipes R, R, which are perforated and serve as spray pipes or sprinklers for showering, spraying or otherwise subdividing the cold liquid pumped from the bath J and distributing it onto the fish or other articles held on the shelves H, H. The circulating pump P may be driven by any suitable source of power, preferably by an electric motor T. The pump is designed to operate intermittently at any suitable intervals,—say, once every thirty or sixty minutes,—and to continue in operation each time for a brief period,—say, one or two minutes. The effect of this is to moisten the fish or other articles with cold liquid often enough to keep them damp and fresh, but without freezing them. If the bath J is of water, it is kept from freezing by a suitable regulation of the temperature in the chill coil L. Instead, however, the bath may be of brine automatically kept at a temperature not lower than 25° F., or well above the freezing point of the particular substances or articles to be preserved.

At the top or upper part of the refrigerating chamber is mounted a non-frosting coil U, which is preferably operated as part of a self-defrosting cycle. The coil U is cooled by a refrigerant to preferably about 20° F., or enough below the freezing point to cause vapor to congeal upon its surface, thus taking up some of the excess humidity within the chamber. The thawing off of the congelation upon this chill coil at intervals is accomplished by automatically shutting off the supply of refrigerant until the coil warms sufficiently to thaw off the accumulated frost, for which purpose a temperature of, say,—40° F. is suitable.

Underneath the coil U is a baffle plate S, sloping downward toward the rear, which has two functions,—namely, to direct the cooled air downward at the rear, causing it to circulate, as shown by the arrows *x*; and to cause the drip during the thawing to fall to the rear of the layers of fish or other articles exposed on the shelves H, H.

The alternation of cooling and warming of the coil U may be accomplished by a valve operated by a timing mechanism, but is preferably accomplished by the application of a two-temperature valve W in the discharge pipe *g*, leading from the coil. The admission of refrigerant to the coil U is determined by an expansion valve *c* under control of a thermostat *d*. A similar expansion valve *e*, controlled by a thermostat *f*, is shown for controlling the temperature in the chill coil L. The compressed, cooled refrigerant coming from the usual condensing coil is introduced through a pipe V, which leads to the respective expansion valves *c* and *e* in the usual manner. The outlet pipe *g* from the upper coil and the outlet pipe *g'* from the lower coil unite in a return refrigerant pipe X, leading back in the well-understood manner to the mechanical refrigerating mechanism, which may be of any of the well known makes, and may operate on any suitable refrigerating medium such as ammonia, sulphur dioxide, methyl chloride, etc.

Z is a timing device which may be an ordinary clock, or may be an electric motor driven train adapted at prescribed intervals to operate a circuit which may control the electric motor T, or may operate the valve W, or both. While this timing device may be variously constructed, it may, for example, be of the construction shown diagrammatically in Fig. 3, where an electric motor *h*, fed from brushes *i* taking current from circuit leads *j*, has on its spindle a worm *k*, actuating a reducing train *m m*, terminating in a circuit closing cam *n* adapted at each revolution to force together contact springs *p*, *p*, and thereby close the circuit in a branch *q* leading to the brushes *r* feeding current to electric motor T. Any clockwork may be substituted for the motor *h* and reducing train for operating the circuit closer *n p*.

Whenever the salesman opens the rear door or window E, it is important to insure that there shall be no discharge of liquid within the refrigerator during the time that this door or window is open. For this purpose a circuit breaker is applied to one or to each of these doors which are shown as sliding doors. So long as the doors are closed, the circuit is complete, and the normal spray operation occurs at the prescribed intervals; but when either door is opened, the circuit is broken, with the result of preventing or interrupting the spraying operation until the door is again closed. This may be variously accomplished, as by use of any of the known electric switches applicable to closet doors or the like. As a simple illustration I have shown in Fig. 3 a suitable circuit breaker. A' is a fragment of the casing of the refrigerator having a slideway *s* in which slides the sash of the door E, which is shown slightly open. When closed it acts against a plunger *t*, and pushes it back against the stress of a spring *t'* to close together two contact springs *u u* which are introduced in the circuit *q*, which feeds the electric motor T. On opening the door E, the plunger *t* springs to the position shown, where the contact spring *u* moves out of contact with its mate, thereby breaking the circuit and preventing the energizing of the motor if the timing device should close the circuit at *p*, or stopping the motor if the circuit should happen to be already closed.

The improved refrigerating show case provided by this invention has important practical advantages. While effecting an important economy as compared with the use of ice, it avoids injury to the fish by reason of the dry air usually within mechanical refrigerators, keeps alive the natural moisture of slime with which the scales of the fish are coated, and avoids all liability of freezing the fish. It has been found by practical test to keep fish in a fresh and well-preserved condition for two weeks or even longer, whereas with the usual ice cooling they can be so kept for only three to five days at the most. The dealer is thus saved practically all of the loss by spoilage heretofore encountered, while the fish as a food product is kept in its most sanitary condition, thereby conserving the public health.

The ice water or other liquid in the bath J is pumped around and used over and over again until such time as the entire refrigerator requires cleaning, which should be done at intervals of one or two weeks. There is thus an important economy as compared with continual use of a fresh supply of water for spraying, especially where the water supply is subject to a high meter charge.

Figure 4:
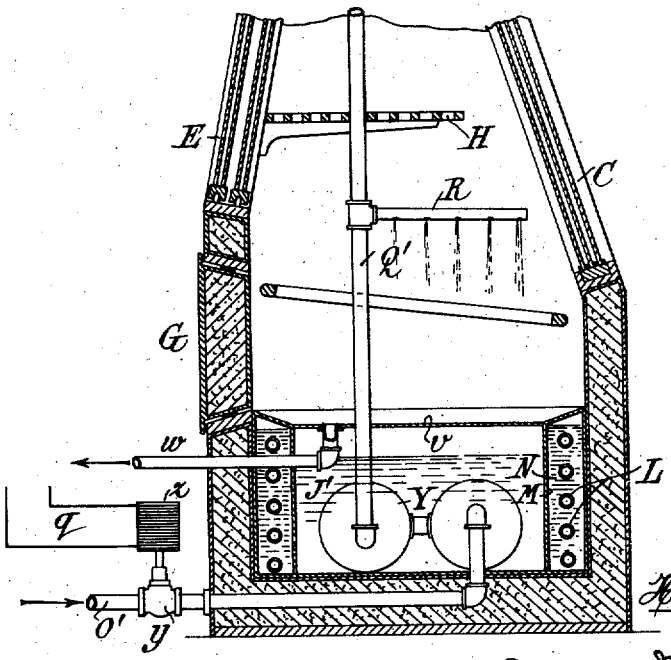
Fig. 4 is a section of the lower part of the apparatus, corresponding to Fig. 1, and showing a modified construction.

In those cases where it is preferred to sprinkle or spray always with fresh water, and then run this water to waste, the construction shown in Fig. 4 may be used. In this case the pool J is replaced by a chill system Y, which may consist of drums, as shown, or of any suitable coil immersed in a liquid bath J', which, like the bath J, is cooled by a chill coil L through a brine or glycerine jacket N. Water from the service main comes in through pipe O', flows through the cooling system Y, and passes out by pipe Q' (which serves the purpose of the pipe Q in the previous construction), and is then discharged through the spray pipes R, of which only one is shown. The sprayed or sprinkled water is caught in a tray *v*, which closes over the top of the bath J', and is drained off by a pipe *w*, leading to the sewer. The flow under pressure through pipes O' Q' may be accomplished by a motor driven pump P, as in the previous construction; but where the service flow is under sufficiently high pressure, the circulating pump may be dispensed with, and the intermittent flow controlled by a valve *y* operated by a solenoid *z*, which may be located in the circuit *q*, shown in Fig. 3. The operation is the same as before, the flow of spray water taking place at intervals of, say, thirty minutes, and continuing for perhaps one or two minutes under control of the timing device Z, and being stopped by the opening of the door E, as already described.

The construction shown in Fig. 4 thus differs from that first described in that fresh service water is introduced at each spraying or showering operation, being cooled to a suitably low temperature by a refrigerating system, which, for convenience, is shown located within the refrigerator casing. It is well known in the art of mechanical refrigeration that the refrigerating or air-conditioning unit or system may be located within the casing as is done in self-contained refrigerators, or may be exterior thereto with suitably connected conduits and means for circulating the air, as in the known diffuser or humidraft systems or other forced draft means.

For illuminating the interior of the refrigerating chamber it is desirable to provide a lamp *l* covered by a deflecting shield in the customary manner.

From the foregoing it will be seen that my invention provides a new method of preserving, storing and displaying fish, or other food articles or perishable products, whereby the same are not frozen, as has been the previous practice, and are kept moist and fresh. It is essential to this method that the water or other moistening or cooling liquid be introduced at suitable intervals and distributed over the fish or other perishable products, the latter being kept at a temperature slightly above the freezing point. This refrigeration of the products is obtained mainly by the cooling of the air, and partly by the cooling of the liquid to a similarly low temperature; but as the showering occurs during only a small fraction of the total time the cooling by refrigerated air accomplishes the principal result, the showering having effect chiefly to moisten the products, for which it must be so cold as not to detract from the refrigerating effect.

For the preservation of fish experience has shown that the best results are attained with a spraying for about 20 to 30 seconds at intervals of about three hours.

In the case of dealing with fish, etc., already frozen, the process has the advantage of thawing the same very slowly, and afterward holding them at a temperature approaching the freezing point.

It is to be understood that the term "spray" as used herein includes any form of subdivided water such as to distribute it with sufficient uniformity over the perishable products to be preserved.

In some cases it may be desirable to use a preservative spray. In such case, for example, a 0.1 per cent. solution of benzoate of soda may be used as the material for the bath J.

The invention is susceptible of various other modifications according to the circumstances, and to comply with any special demands, its construction being subject to change according to the skill or judgment of experts in the art of refrigeration for adapting it to any given set of conditions.

What I claim is:

1. A refrigerator casing having within it a cold bath beneath, a chill coil above, an intermediate shelf for receiving the articles to be preserved, a spray pipe located to discharge spray thereupon, means for discharging a cooling liquid at intervals through said spray pipe, and refrigerating means for cooling said liquid at a temperature approximating the freezing point, but insufficiently low to freeze the articles to be preserved, and for cooling said chill coil to maintain the enclosed air within the casing at a refrigerating temperature.

2. A refrigerator according to claim 1, the chill coil at the top having means for periodically stopping the circulation of refrigerant thereto to permit the ice congealed thereon to thaw off therefrom.

3. A refrigerator according to claim 1, the chill coil at the top having means for periodically stopping the circulation of refrigerant thereto to permit the ice congealed thereon to thaw off therefrom, and a baffle plate beneath such coil for receiving the drip therefrom.

4. A refrigerator according to claim 1 with a baffle plate beneath the chill coil sloped backwardly to discharge drip therefrom and direct the descending air toward the rear of the refrigerator chamber.

5. A refrigerator according to claim 1, having means for drawing liquid from said cold bath beneath, and delivering same to said spray pipes.

6. A refrigerator according to claim 1, having means for drawing liquid from said cold bath beneath, and delivering same to said spray pipes, and means for draining the sprayed liquid back into said cold bath.

7. A refrigerator according to claim 1, having a water supply pipe passing into cooling contact with said cold bath beneath and discharging to said spray pipe, whereby to spray fresh cold water, and a drain for discharging the water so sprayed.

8. A refrigerator according to claim 1, having a cold bath beneath enclosed within a jacket, the refrigerating means therefor comprising a coil within said jacket, and a non-congealable liquid in said jacket for transferring heat units from said bath to said chill coil.

9. A refrigerator according to claim 1, the refrigerating means having automatic temperature control means adapted to maintain the cold bath beneath at a temperature barely above freezing, and to control the temperature of the chill coil above to maintain the enclosed air within the casing at approximately 35 to 40° F.

10. A refrigerator according to claim 1, having a timing device connected to control the intermittent spraying of liquid to discharge the same at approximately uniform intervals.

11. A refrigerator according to claim 1, having a door for getting access to its interior, and means actuated upon the opening of said door to arrest the spraying of liquid.

12. A refrigerator according to claim 1, having a door for getting access to its interior, and means actuated upon the opening of said door to arrest the spraying of liquid, said means comprising an electric circuit controlling the flow of liquid to the spray pipe, and a circuit breaker operated by the door.

13. A refrigerator according to claim 1, having a motor driven pump for discharging liquid to said spray pipe, an electric circuit feeding the motor of said pump, a circuit breaker in said circuit, and a door for getting access to the interior of the refrigerator, and said circuit breaker operatively connected to said door.

14. A refrigerator comprising a preserving chamber, means in said chamber for supporting articles to be preserved, means for distributing a precooled liquid over said articles at intermittent intervals of short duration as compared with intervening periods of a duration such as to permit the atmosphere in the chamber to clear of excess moisture due to supersaturation and remain clear for a relatively large proportion of the time, and refrigerating means for cooling the air in said chamber and for precooling the liquid to be distributed to temperatures sufficiently low to keep such articles at or near the freezing point but not so low as to freeze them.

15. A refrigerator according to claim 14, the chill coil having means for periodically stopping the circulation of refrigerant thereto to permit the ice congealed thereon to thaw off therefrom.

16. A refrigerator according to claim 14, the chill coil having means for periodically stopping the circulation of refrigerant thereto to permit the ice congealed thereon to thaw off therefrom, and a baffle plate beneath such coil for receiving the drip therefrom.

17. A refrigerating display case having a support for the articles to be preserved, a chill coil, a sprinkling device for showering a cooling liquid upon such articles, a water supply pipe for said sprinkling device, refrigerating means for cooling the chill coil and the water in said supply pipe, and a drain for discharging the water falling from said articles.

18. A refrigerator having a support for the articles to be preserved, a chill coil, a sprinkling device for intermittently showering a cooling liquid upon such articles, means for discharging said liquid at recurrent intervals of time, and refrigerating means for maintaining the chill coil at a temperature such as to keep the air within the refrigerator at approximately 35 to 40° F. and for cooling the showered liquid to a temperature barely above freezing.

19. A refrigerator according to claim 14, having a timing device to control the intermittent supply of liquid to the distributing means.

20. A method of preserving fish or other perishable articles, consisting in distributing over them at time intervals of short duration, as compared with intervening intervals, a chilling liquid precooled to a temperature approximating the freezing point, but not so low as to freeze them, the duration of the intervals of time intervening between the intervals of liquid distribution being such as to permit the atmosphere about the articles to clear of excess moisture due to supersaturation and remain clear for a material proportion of the time.

21. A method of preserving fish or other perishable articles, consisting in distributing over them at time intervals of short duration, as compared with intervening intervals, a precooled chilling liquid while maintaining them at a temperature approximating the freezing point, but not so low as to freeze them, the duration of the intervals of time intervening between the intervals of liquid distribution being such as to permit the atmosphere about the articles to clear of excess moisture due to supersaturation and remain clear for a material proportion of the time.

22. A method of preserving fish or other perishable articles, consisting in maintaining them at a temperature approximating the freezing point, but no so low as to freeze them, and showering them with precooled water at intermittent intervals of a frequency such as to keep them moist but such as to permit the surrounding atmosphere to clear of excess moisture due to supersaturation between the successive showers.

23. A method of preserving fish or other perishable articles, consisting in placing them within a refrigerator chamber, maintaining the air therein at a refrigerating temperature, and showering them intermittently with a precooled liquid, the air and liquid being maintained at temperatures near the freezing point but not sufficiently low to freeze the articles, the intervals between showers being of sufficient duration to permit the atmosphere in the chamber to clear of excess moisture due to supersaturation and remain clear for a material portion of the time.

24. A method of preserving and displaying fish or other perishable articles, consisting in exposing them within a display case, maintaining them therein at a refrigerating temperature and showering them intermittently with a chilling liquid precooled to a temperature near the freezing point but not sufficiently low to freeze the articles, the intervals between showers being of sufficient duration to permit the atmosphere in the case to clear of excess moisture due to supersaturation and remain clear for a material portion of the time.

25. A method of preserving fish or other perishable articles, consisting in showering them at intermittent time intervals with ice water while maintaining them at a temperature approximating the freezing point, but not so low as to freeze them, the duration of the intervals of time between successive showers being such as to permit the atmosphere about the articles to clear of excess moisture due to supersaturation and remain clear for a material portion of the time.

26. A method of preserving fish or other perishable articles, consisting in placing them within a refrigerator chamber, maintaining the air therein at a refrigerating temperature and showering them at intervals with ice water at a temperature approximating the freezing point, but not so low as to freeze them, the intervals between showers being of sufficient duration to permit the atmosphere in the chamber to clear of excess moisture due to supersaturation and remain clear for a material portion of the time.

HOWARD L. FORMAN.